No. 612,401. Patented Oct. 18, 1898.
O. H. COLLMER.
BALL BEARING MECHANISM.
(Application filed July 12, 1897.)
(No Model.)
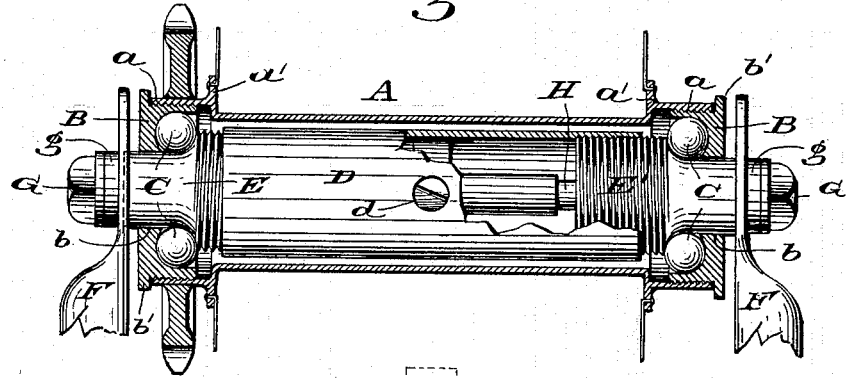
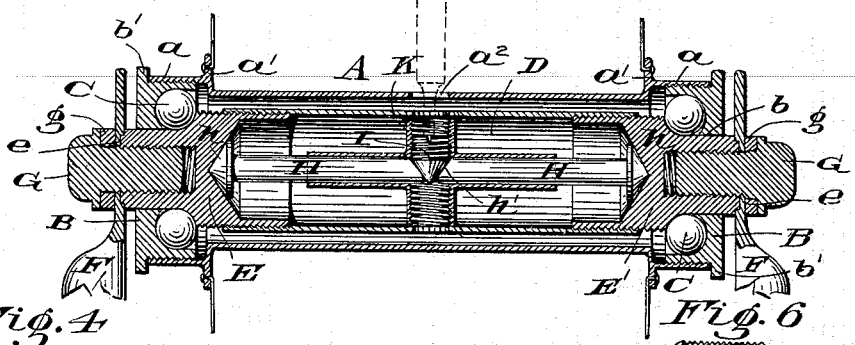
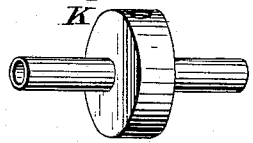
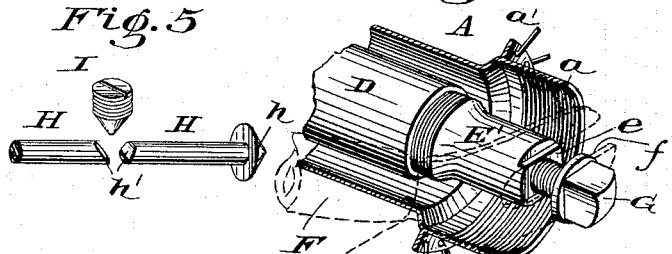
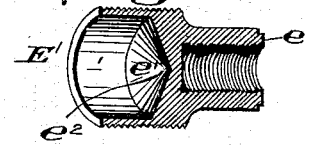
Witnesses:
W. H. Rowe,
C. H. Schafer.
Inventor:
Otto H. Collmer.
By his atty.
C. B. Reichell
THE NORRIS PETERS CO., PHOTO-LITHO., WASHINGTON, D. C.

UNITED STATES PATENT OFFICE.

OTTO H. COLLMER, OF SOUTH BEND, INDIANA.

BALL-BEARING MECHANISM.

SPECIFICATION forming part of Letters Patent No. 612,401, dated October 18, 1898.

Application filed July 12, 1897. Serial No. 644,238. (No model.)

*To all whom it may concern:*

Be it known that I, OTTO H. COLLMER, a citizen of the United States, residing at South Bend, in the county of St. Joseph and State of Indiana, have invented certain new and useful Improvements in Ball-Bearing Mechanisms, of which the following is a specification.

My invention relates to ball-bearings for vehicles generally, though it is more especially adapted for the axles of bicycles.

The object of my invention is primarily to provide improved means for adjusting the ball-bearings near the ends of the axle without removing or in any way interfering with the means for securing the axle to the frame and which will also admit of the removal of the wheel and axle from the frame without disturbing in any way the adjustment of the ball-bearings.

A further object of my invention is to allow the wheel and axle to be removed from the frame and the balls removed from the bearing to be cleaned and then replaced without disturbing the adjustment of the ball-bearings.

A further object of my invention is to securely hold the ends of the axle in the frame-slots without changing or endangering the adjustment of the bearings by the frictional contact of the balls running in the bearings of the cover or cup.

To these and to such other ends as may pertain thereto, as hereinafter stated, my invention consists in the novel construction, combination, and adaptation of parts, as will be hereinafter more fully described, and specified in the claims hereto annexed.

In the accompanying drawings, Figure 1 is a plan view of a bicycle-axle secured to parts of the frame and partly broken away at one end and also showing the hub-cup bearings and sprocket-wheel in section; Fig. 2, a horizontal axial sectional view of the said axle, hub, cup, and cone-bearings, with fragments of the frame secured to the axle, with the locking-pins and wedge shown in full lines and the adjusting-wrench shown in dotted lines; Fig. 3, a perspective view of a fragment of the axle and end stud-bolts in full lines and a similar adjacent part of the hub in section; Fig. 4, a perspective view of the abutment-block and guide-tubes for supporting the locking-pins; Fig. 5, a perspective view of one and part of the other of the said locking-pins and wedge-screw; Fig. 6, a sectional perspective view of one of the adjustable cone-bearings, and Fig. 7 a perspective view of the end stud-bolt for securing the axle upon the frame.

The hub-cylinder A has enlarged ends $a\ a$, screw-threaded, respectively, in opposite directions, and shoulder-flanges $a'\ a'$, perforated to receive the inner ends of the spokes. The ends $a\ a$ of the hub-cylinder are each fitted with threaded cup-bearings B, having a central hole $b$ to receive the ends of the axle, and outer flanges $b'$, which are screwed up tightly against the ends $a\ a$ of the hub-cylinder, thus providing fixed end bearings and abutments for the balls C, held therein to bear upon the ends of the axle, the rotation of the balls serving to screw the cup-bearings tightly against the ends of the hub-cylinder. The axle comprises, essentially, an axle-sleeve D and cone-bearings E and E', adjusted and secured in the ends of the axle-sleeve in a novel manner to provide inner bearings for the balls C, which may be either pushed outwardly or drawn together by the rotation of the axle-sleeve without changing in any way the fixed positions of the cup-bearings upon the ends of the hub-sleeve, thus enabling the hub and axle to be removed from the frame without interfering with the adjustment of the ball-bearings, which adjustment is made only from the inside outwardly, thus allowing the cup-bearings to be removed from the ends of the sleeve, the axle, balls, cone-bearings, and cup-bearings thoroughly cleaned, and all returned to their former adjusted positions by the most unskilled person, it being only required to screw the cup-bearings back upon the hub-sleeve as far as they will go until the flanges $b'$ abut solidly against the ends of the hub-sleeve after the axle and balls have been placed within the hub.

The hub-sleeve has a pin-aperture $a^2$ intermediately bored therein, and the axle-sleeve has a corresponding pin-aperture $d$ therein, through both of which a pin may be placed when it is required to set the cone-bearings up or adjust them to take up any lost motion between the ball-bearings and the balls. This is done by placing a pin-wrench through the said apertures $a^2$ and $d$ and turning the wheel, the hub-sleeve, and axle-sleeve, which adjusts the cone-bearings E E' either outwardly or inwardly as the wheel is turned, the cone-axles being held from turning by means of flat parallel shoulders $e$ on the outer ends of the cone-bearings, which closely fit the slot $f$ in the end of the frame F, as shown by dotted lines in Fig. 3, the axle being held securely thereon by stud-bolts G at either end thereof, which screw into the outer ends of the cone-bearings E E' and by means of washers $g$ thereon bear against the outer faces of the ends of the frame.

The cone-bearings have cup-shaped inner ends $e'$, the bottoms or inner faces $e^2$ of which receive the conical ends or heads $h$ of locking-pins H, which are forced outwardly in a suitable manner to bear against said faces, and thus lock the cone-bearings in their adjusted positions. The locking-pins H may be separately operated by suitable means to press each against the cone-bearings, or they may be operated jointly by means of a wedge or cone block I, screw-threaded and fitted in a correspondingly-threaded abutment-block K, secured to the middle of the inside of the axle-sleeve D, as shown in Fig. 2, which bears against the inclined inner ends $h'$ of said locking-pins, a slot in the block I being made to receive a blade upon the pin (shown by dotted lines in Fig. 2) for turning and adjusting the said wedge-block. The inner ends of the locking-pins H are supported in tubular bearings secured to the abutment-block K and are held in the axial line of the axle-sleeve, thus guiding the said locking-pins truly to bear at their outer ends against the center of recesses or cups upon the inner faces of the cone-bearings, and thus securely lock the said bearings in their adjusted positions.

I claim as my invention and desire to secure by Letters Patent—

1. A ball-bearing axle comprising a sleeve having threads at its opposite ends, bearings correspondingly threaded to fit said sleeve, said bearings being adjustable toward or from each other by the rotation of the sleeve and non-rotatably secured to the frame of the vehicle, and means located within the said axle-sleeve for locking both the bearings conjointly therein, substantially as described.

2. A hub-sleeve having screw-threaded ends and an intermediate pin-aperture therein, cup-bearings to fit said ends, an axle-sleeve threaded at its ends and having a corresponding intermediate aperture therein, cone-bearings to fit the ends of the axle-sleeve having cup-shaped inner ends, a centrally-supported guide-tube inside the axle-sleeve and outwardly-adjustable bolts fitted therein and provided with end bearings to fit the cup-shaped inner ends of the cone-bearings, and means for adjusting and locking said bolts from the outside of the axle-sleeve, substantially as described.

3. A hub-sleeve having a pin-aperture therein and cup-bearings fitted upon the ends of said sleeve, an axle-sleeve having a pin-aperture therein and a threaded central abutment communicating with said pin-aperture, cone-bearings adjustably fitted in the ends of the axle-sleeve and having bearings at their inner ends, bolts supported upon the central abutment and a screw-actuated wedge fitted in the central abutment to move the bolts and lock the axle-sleeve to the cone-bearings, substantially as described.

In testimony that I claim the foregoing as my invention I have signed my name in the presence of two subscribing witnesses.

OTTO H. COLLMER.

Witnesses:
B. KRUEPER,
W. H. ROWE.